(12) United States Patent
Amendjian et al.

(10) Patent No.: US 9,354,958 B2
(45) Date of Patent: May 31, 2016

(54) PERSONALIZING ERROR MESSAGES BASED ON USER LEARNING STYLES

(71) Applicant: INTERNATIONAL BUSINESS MACHINES CORPORATION, Armonk, NY (US)

(72) Inventors: Hagop Amendjian, Dollard-des-Ormeaux (CA); Leon H. Cash, Jr., Durham, NC (US); Manvendra Gupta, Brampton (CA); Stewart J. Hyman, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 14/154,605

(22) Filed: Jan. 14, 2014

(65) Prior Publication Data

US 2015/0199615 A1    Jul. 16, 2015

(51) Int. Cl.
*G06F 17/00* (2006.01)
*G06F 11/07* (2006.01)
*G06F 17/30* (2006.01)
*G06N 99/00* (2010.01)
*G06N 7/00* (2006.01)

(52) U.S. Cl.
CPC ...... *G06F 11/0769* (2013.01); *G06F 17/30882* (2013.01); *G06N 99/005* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 6,807,535 | B2 * | 10/2004 | Goodkovsky | G09B 7/04 706/3 |
| 7,159,146 | B2 | 1/2007 | Bowers et al. | |
| 7,165,202 | B2 | 1/2007 | Eatough et al. | |
| 7,219,101 | B2 | 5/2007 | Dorsey | |
| 8,684,747 | B1 * | 4/2014 | Bergeron | G09B 7/04 434/323 |
| 2010/0075289 | A1 | 3/2010 | Maher et al. | |

OTHER PUBLICATIONS

Huang et al. "What type of learning style leads to online participation in the mixed-mode e-learning environment? A study of software usage instruction", Computers & Education 58 (2012) pp. 338-349.*
Klasnja-Milicevic et al. "E-Learning personalization based on hybrid recommendation strategy and learning style identification", Computers & Education 56, 2011, pp. 885-899.*
Wikipedia; Learning Styles; Retrieved from the Internet URL: <http://en.wikipedia.org/wiki/Learning_styles; retrieved on May 28, 2013; 10 pages.
IBM; Level-based information display window; IP.com; IPCOM000015386D; original publication date: Nov. 3, 2001; IP.com Electronic Publication date Jun. 20, 2003; 5 pages.
U.S. Appl. No. 14/154,686, filed Jan. 14, 2014.

* cited by examiner

*Primary Examiner* — Li-Wu Chang
(74) *Attorney, Agent, or Firm* — Schmeiser, Olsen & Watts; John Pivnichny

(57) ABSTRACT

An approach is provided for personalizing an error message for a user. The usage of help content by the user to resolve error condition(s) is monitored. Attributes of the usage are determined. A learning style of the user is determined based on the attributes. An error condition is detected. The error message is augmented (i.e., personalized) with a communication and/or hyperlink that is compatible with the learning style of the user, and that is configured to assist the user with resolving the detected error condition. The augmented error message is presented to the user.

17 Claims, 7 Drawing Sheets

PERSONALIZING ERROR MESSAGES BASED ON USER LEARNING STYLES

TECHNICAL FIELD

The present invention relates to a data processing method and system for managing user interface messages, and more particularly to a technique for personalizing error messages.

BACKGROUND

An end user viewing an error message finds it difficult to determine the problem indicated by the message or the action to take when encountering an exceptional situation while operating a computer system or application. To determine the action to take when an error occurs, the end user may utilize error codes, user manuals, a search of documentation or the Internet to determine the root cause of the error, troubleshooting suggestions, and "fix this problem" graphical user interface buttons. Known customization of error messages includes internationalization of the messages. Error messages are internationalized by generating a hashmap or database table that indexes the error message to be displayed with an error key. A different error message is provided for each language. Based on the user's language preference, the message in that language is displayed. These known error message customization techniques are limited to internationalization and therefore fail to account for other relevant differences in user attributes that affect how easily users can determine a cause of a problem or the action to take in response to an error message.

BRIEF SUMMARY

In a first embodiment, the present invention provides a method personalizing an error message for a user. The method includes a computer monitoring a usage by the user of content of a help system integrated with a software application. The usage of the content causes the user to resolve one or more error conditions. The method further includes the computer determining attributes of the usage of the content of the help system. The method further includes the computer determining a learning style of the user based on the attributes. The method further includes, subsequent to the step of determining the learning style, the computer detecting an error condition. The method further includes the computer augmenting the error message with a communication and/or a hyperlink that activates an action. The communication and hyperlink are compatible with the learning style of the user and are configured to assist the user with resolving the error condition. The method further includes the computer presenting the augmented error message to the user during an interaction between the user and the application.

In a second embodiment, the present invention provides a central processing unit (CPU); a memory coupled to the CPU; and a computer-readable, tangible storage device coupled to the CPU. The storage device includes instructions that are executed by the CPU via the memory to implement a method of personalizing an error message for a user. The method includes a computer system monitoring a usage by the user of content of a help system integrated with a software application. The usage of the content causes the user to resolve one or more error conditions. The method further includes the computer system determining attributes of the usage of the content of the help system. The method further includes the computer system determining a learning style of the user based on the attributes. The method further includes, subsequent to the step of determining the learning style, the computer system detecting an error condition. The method further includes the computer system augmenting the error message with a communication and/or a hyperlink that activates an action. The communication and hyperlink are compatible with the learning style of the user and are configured to assist the user with resolving the error condition. The method further includes the computer system presenting the augmented error message to the user during an interaction between the user and the application.

In a third embodiment, the present invention provides a computer program product including a computer-readable, tangible storage device and a computer-readable program code stored in the computer-readable, tangible storage device. The computer-readable program code includes instructions that are executed by a central processing unit (CPU) of a computer system to implement a method of personalizing an error message for a user. The method includes a computer system monitoring a usage by the user of content of a help system integrated with a software application. The usage of the content causes the user to resolve one or more error conditions. The method further includes the computer system determining attributes of the usage of the content of the help system. The method further includes the computer system determining a learning style of the user based on the attributes. The method further includes, subsequent to the step of determining the learning style, the computer system detecting an error condition. The method further includes the computer system augmenting the error message with a communication and/or a hyperlink that activates an action. The communication and hyperlink are compatible with the learning style of the user and are configured to assist the user with resolving the error condition. The method further includes the computer system presenting the augmented error message to the user during an interaction between the user and the application.

Embodiments of the present invention present error messages that include information relevant to a particular end user, based on the end user's past behavior and/or based on the end user's learning style. The error messages provide a mechanism to reinforce key concept(s) behind the task that the end user is trying to accomplish in a format that is best suited to the end user's learning style.

DETAILED DESCRIPTION

Overview

Embodiments of the present invention provide users with personalized error messages based on the learning styles of the users, the level of knowledge of the users, and/or historical user behavior such as previous corrective actions taken by the users. The personalization of error messages may also be based on information stored in user profiles. An error message personalized for a particular user may include a predetermined system error message augmented with (1) content that is compatible with a user's learning style, (2) content that takes into account a user's existing skill level, and/or (3) content that summarizes and/or links to corrective actions that were commonly taken or responses that were commonly provided by the user to resolve the error condition indicated by the error message.

As used herein, a learning style is defined as a person's natural or habitual pattern of acquiring and processing information in learning situations.

System for Personalizing Error Messages

Figure 1:
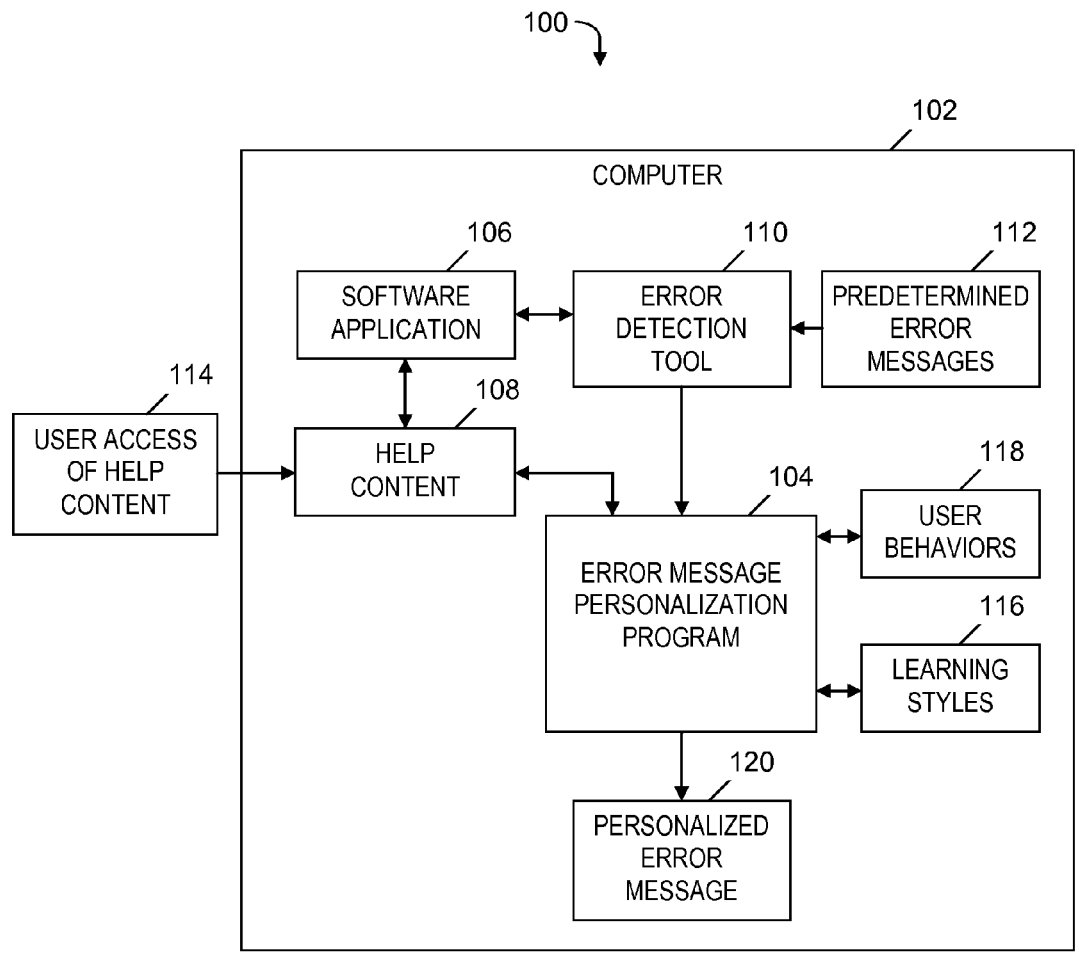
FIG. 1 is a block diagram of a system for personalizing error messages, in accordance with embodiments of the present invention.

FIG. 1 is a block diagram of a system for personalizing error messages, in accordance with embodiments of the present invention. A system 100 includes a computer 102, which executes a software-based error message personalization program 104 and a software application 106, which accesses a help subsystem (not shown) integrated with software application 106. The help subsystem includes help content 108 that can be accessed and viewed by a user of computer 102, and that provides guided assistance to help a user interact with software application 106 or computer 102. Computer 102 also executes software-based error detection tool 110, which detects error conditions that indicate problems with software application 106 or computer 102. In response to detecting an error condition, error detection tool 110 accesses predetermined error messages 112 in a database or other data repository (not shown) to select one of the error messages 112 that describes the detected error condition.

A user access 114 of help content 108 provides the user with guided assistance with software application 106 or computer 102. Error message personalization program 104 monitors users' usage of help content 108 to obtain the aforementioned guided assistance. Error message personalization program 104 monitors user behavior 118 of users of computer 102, including the online information sources accessed by users via computer 102 or via the Internet (not shown) to resolve error conditions detected by error detection tool 110. Using the monitored usage of help content 108, error message personalization program 104 determines learning styles 116 of the users of computer 102.

Based on a learning style 116 of a particular user of computer 102 and the user behavior 118 of the particular user, error message personalization program 104 generates a personalized error message 120 for the user (i.e., an error message 120 that is compatible with the particular user's learning style and that summarizes previous user behavior that had been used to solve the error condition specified by the error message 120).

As one alternative embodiment, error message personalization program 104 determines learning styles 116 but not user behavior 118, and generates personalized error message 120 that is compatible with the user's learning style 116.

As another alternative embodiment, error message personalization program 104 determines user behavior 118 but not learning styles 116, and generates personalized error message 120 so that the message includes (1) a summary of user behavior 118 that had been used previously to solve the error condition specified by error message 120 and/or (2) hyperlink(s) to perform actions included in user behavior 118.

The functionality of the components of FIG. 1 is described in more detail in the discussion presented below relative to FIGS. 2A-2B and FIG. 3.

Process for Personalizing Error Messages Based on Learning Styles

Figure 2A:
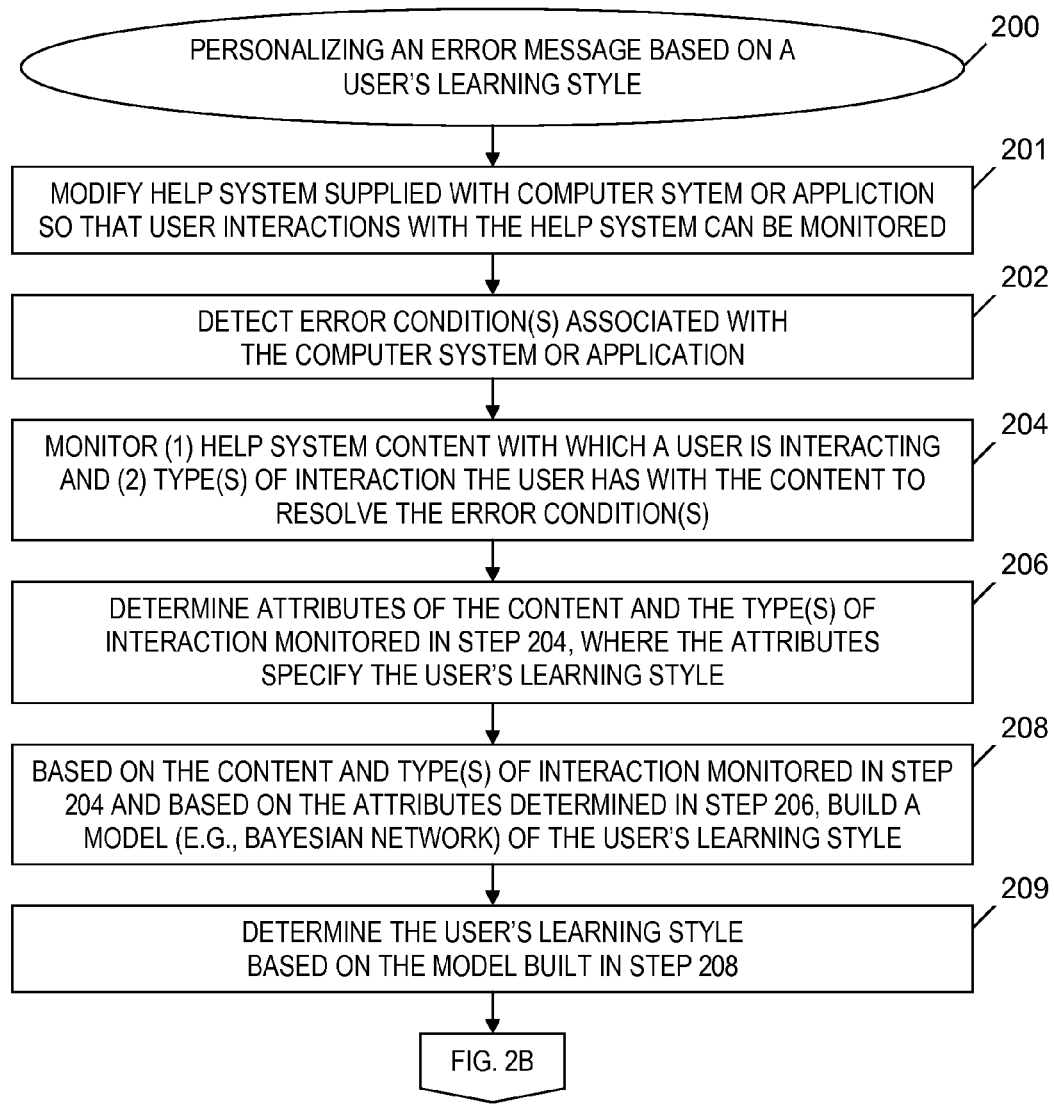
FIGS. 2A-2B depict a flowchart of a process of personalizing an error message for a user based on a learning style of the user, where the process is implemented in the system of FIG. 1, in accordance with embodiments of the present invention.
Figure 2B:
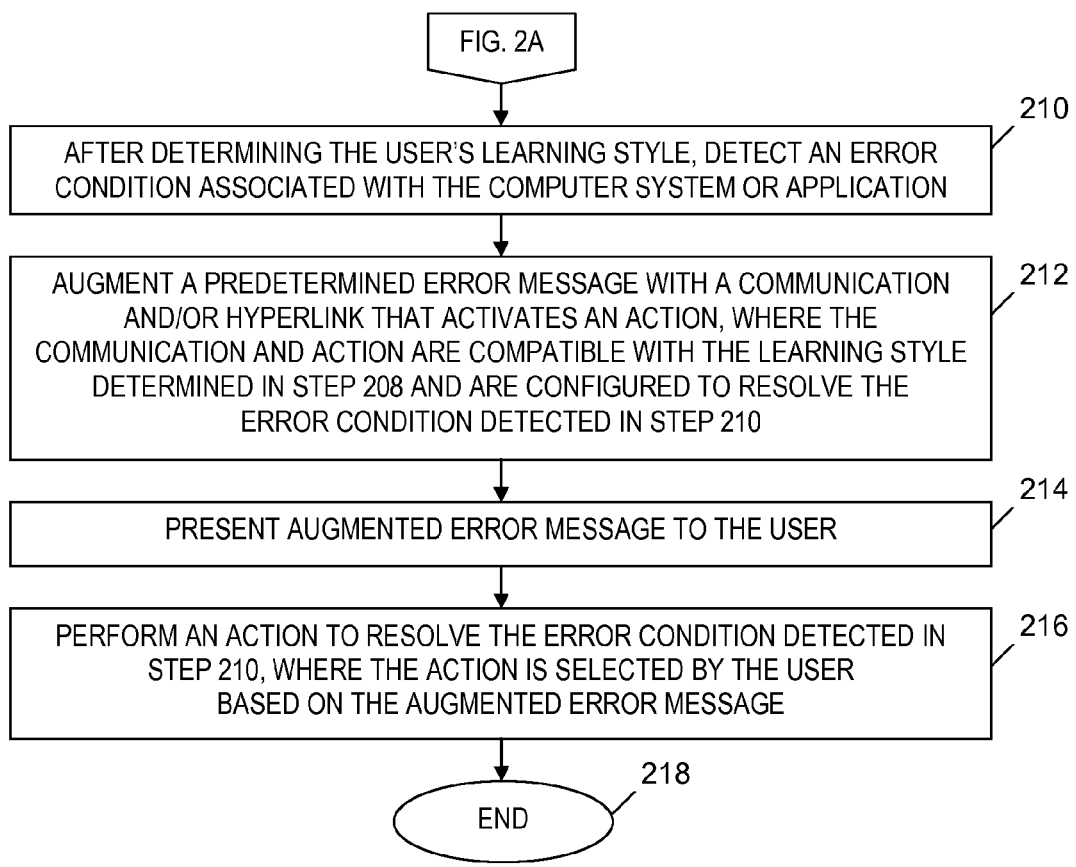

FIGS. 2A-2B depict a flowchart of a process of personalizing an error message for a user based on a learning style of the user, where the process is implemented in the system of FIG. 1, in accordance with embodiments of the present invention. The process of personalizing an error message based on a user's learning style starts at step 200. In step 201, error message personalization program 104 (see FIG. 1) modifies a help system that is supplied and/or is integrated with software application 106 (see FIG. 1) or with an operating system running on computer 102 (see FIG. 1). The modification to the help system provides error message personalization program 104 (see FIG. 1) with a capability to monitor user interactions with the help system, so that error personalization program 104 (see FIG. 1) can track and record the content 108 (see FIG. 1) of the help system that a user is interacting with and the types of interactions with the help system that the user is employing. The modified help system includes various types of help content 108 (see FIG. 1) and provides various types of interaction with the help content 108 (see FIG. 1), where each type of help content and each type of interaction is compatible with one or more respective learning styles. When using the help system, each user's selection of the type of help content 108 (see FIG. 1) and the type of interaction provided with the selected type of help content indicates the user's learning style. For example, program 104 (see FIG. 1) modifies the help system so that help content 108 (see FIG. 1) includes text and a figure to explain each error condition. By including both text and a figure, help content 108 (see FIG. 1) in the modified help system includes content that is compatible with a user who has a learning style that prefers visual input and other content that is compatible with a user who has a learning style that prefers verbal input.

In step 202, error detection tool 110 (see FIG. 1) detects one or more error conditions associated with the operation of software application 106 (see FIG. 1) or computer 102 (see FIG. 1). After step 202 and prior to step 204, error message personalization program 104 (see FIG. 1) receives the detected error condition(s) from error detection tool 110 (see FIG. 1).

In step 204, error message personalization program 104 (see FIG. 1) monitors (1) help content 108 (see FIG. 1) with which a user is interacting, and (2) type(s) of interaction the user has with help content 108 (see FIG. 1) to resolve the error condition(s) detected in step 202.

In step 206, error message personalization program 104 (see FIG. 1) determines attributes of the help content 108 (see FIG. 1) that is monitored in step 204. In one embodiment, the attributes determined in step 206 include one or more of the following items: learning format, learning type, interactivity level, interactivity type, and semantic density that is utilized, preferred or required by a user to learn about the error condition(s) detected in step 204 and the actions to resolve the error condition(s).

Learning format is the format of help content 108 (see FIG. 1) that the user utilizes to learn about the error condition(s)

and actions to resolve the error condition(s). Examples of learning format include text, image, audio, video, and application.

Learning type is the type of help content 108 (see FIG. 1) that the user utilizes to learn about the aforementioned error condition(s) and actions. Examples of learning type include a learning exercise, simulation, questionnaire, figure, index, table of information, narrative text, exam, and lecture.

Interactivity level is an indicator of the amount of interactivity provided by the help content 108 (see FIG. 1) that the user utilizes to learn about the aforementioned error condition(s) and actions. Examples of interactivity level include very low, low, medium, high and very high, where very low indicates no interactivity options, low indicates help documentation or web links with 100% relevance, medium indicates help documentation or web links with at least 75% relevance, high indicates continuous movement or response based on feedback, and very high indicates a requirement for simulation or game-based learning.

Interactivity type is a type of interactivity provided by the help content 108 (see FIG. 1) that the user utilizes to learn about the aforementioned error condition(s) and actions. Examples of interactivity type include active, expositive, and mixed (i.e., a mixture of active and expositive).

Semantic density is an indication of the number of instances of a particular learning type that is preferred by the user to learn about the aforementioned error condition(s) and actions. Examples of semantic density include very low, low, medium, high and very high.

Figure 4:
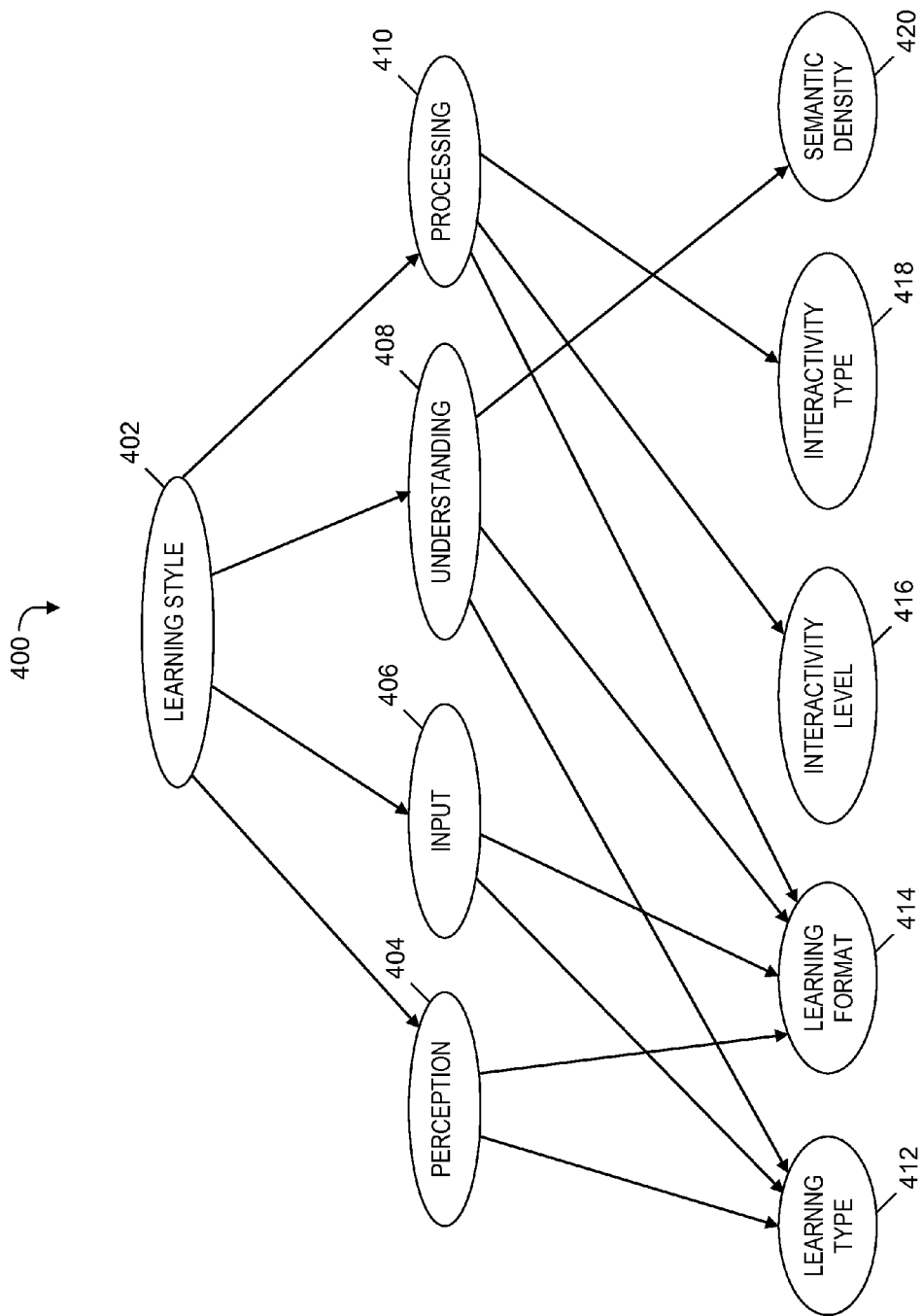
FIG. 4 is an exemplary model of a user's learning style used in the process of FIGS. 2A-2B, in accordance with embodiments of the present invention.

In step 208, based on the help content 108 (see FIG. 1) and type(s) of interaction monitored in step 204 and based on the attributes determined in step 206, error message personalization program 104 (see FIG. 1) builds a model of the user's learning style 116 (see FIG. 1). For example, the model built in step 208 is a Bayesian network. See FIG. 4 and the discussion of FIG. 4 presented below for an example of a model built as a Bayesian network.

In step 209, based on the model built in step 208, error message personalization program 104 (see FIG. 1) determines the learning style 116 (see FIG. 1) of the user. In one embodiment, error message personalization program 104 (see FIG. 1) models the help content 108 (see FIG. 1) and the type(s) of interaction monitored in step 204, and the attributes determined in step 206 by using a Bayesian network. Error message personalization program 104 (see FIG. 1) uses the Bayesian network-based model to deduce the learning style 116 (see FIG. 1) of the user. For example, error message personalization program 104 (see FIG. 1) deduces the learning style 116 (see FIG. 1) of the user based on the type of interaction the user has with the help system.

For example, in step 209, error message personalization program 104 (see FIG. 1) determines a first user's learning style based on the model built in step 208 indicating a preference for learning about an error condition by watching a video tutorial. As another example, in step 209, error message personalization program 104 (see FIG. 1) determines a second user's learning style based on the model built in step 208 indicating a preference for learning about an error condition by being able to select hyperlinks that describe the details of a step-by-step process of resolving the error specified by the error condition.

In step 210 in FIG. 2B, after determining the learning style 116 (see FIG. 1) of the user, error detection tool 110 (see FIG. 1) detects an error condition that indicates an error in the operation of software application 106 (see FIG. 1) or computer 102 (see FIG. 1) and retrieves a predetermined error message 112 (see FIG. 1) from a data repository, where the retrieved error message describes the detected error condition. After step 210 and prior to step 212, error message personalization program 104 (see FIG. 1) receives the error condition and the predetermined error message 112 (see FIG. 1) from error detection tool 110 (see FIG. 1).

In step 212, error message personalization program 104 (see FIG. 1) augments the retrieved predetermined error message 112 (see FIG. 1) with a message (i.e., communication) to the user and/or a hyperlink that when selected performs an action. The communication and action are compatible with the learning style determined in step 209 (see FIG. 2A). The communication and action are configured to resolve the error condition detected in step 210. The augmented version of error message 112 (see FIG. 1) is also referred to herein as personalized error message 120 (see FIG. 1).

In step 214, error message personalization program 104 (see FIG. 1) presents personalized error message 120 (see FIG. 1) to the user (e.g., initiates a display of personalized error message 120 (see FIG. 1) on a screen that is viewed by the user).

After step 214 and prior to step 216, error message personalization program 104 (see FIG. 1) receives an action selected by the user to resolve the error condition detected in step 210, where the selection of the action is based on the user viewing the personalized error message 120 (see FIG. 1) presented in step 214. In step 216, error message personalization program 104 (see FIG. 1) or another program executed by computer 102 (see FIG. 1) performs the selected action to resolve the error specified by the error condition detected in step 210.

In step 218, the process of personalizing an error message based on a user's learning style ends.

As one example, error message personalization program 104 (see FIG. 1) monitors a user's repeated interaction with a "show me how?" feature of a help system in step 204 (see FIG. 2A) and determines that a repeated interaction with the "show me how?" feature indicates the user requires high interactivity (i.e., an attribute of high interactivity is determined in step 206 in FIG. 2A). The user's learning style that is specified by a preference for high interactivity is determined in step 209 (see FIG. 2A). In this example, a subsequent augmented error message resulting from step 212 (see FIG. 2B) includes an added feature for communicating an action to the resolve the error condition detected in step 210 (see FIG. 2B), where the added feature has high interactivity, which makes the augmented message compatible with the user's learning style.

In one embodiment, prior to step 214, error message personalization program 104 (see FIG. 1) retrieves information from a user profile for the user and further augments the predetermined error message with retrieved information from the user profile and/or based on the retrieved information. The user profile is stored in a data repository such as a database. For example, error message personalization program 104 (see FIG. 1) can retrieve the name of the user from the user profile and augment the predetermined error message by adding the user's name before or within the aforementioned personalized error message which is based on the user's learning style. As another example, error message personalization program 104 (see FIG. 1) can retrieve the age of the user and determine a writing style to present textual instructions in a personalized error message based on the age of the user. For instance, for User 1, who is a relatively young user, error message personalization program 104 (see FIG. 1) generates a personalized error message in step 212 that has an instruction written in the style of a text message, which is not written according to the rules of standard English grammar, spelling and punctuation. For User 2, who is significantly older than User 1, error message personalization program 104 (see FIG. 1) can generate a personalized error message in step 212 that has instructions written according to the rules of standard English grammar, spelling and punctuation.

In one embodiment, the process of FIGS. 2A-2B is performed multiple times for different users, which results in different personalized error messages being generated in step 212 for respective users. For example, in a first performance of the process of FIGS. 2A-2B, the monitoring in step 204 (see FIG. 2A) of the utilization of help content 108 (see FIG. 1) by User 1 to resolve error conditions reveals that the learning style of User 1 is indicated by preferences for a single example that features an image including a figure with a high level of interactivity which has a mixture of active and expositive types of interactivity. Furthermore, in a second performance of the process of FIGS. 2A-2B, the monitoring in step 204 (see FIG. 2A) of the utilization of help content by User 2 to resolve error conditions reveals that the learning style of User 2 is indicated by preferences for multiple text-based narratives that feature no interactivity. In this example, step 212 in the first performance of the process of FIGS. 2A-2B generates a personalized error message for User 1 that includes a hyperlink to a figure that includes a high level of interactivity, which is compatible with User 1's learning style. Moreover, step 212 in the second performance of the process of FIGS. 2A-2B in this example generates a personalized error message for User 2 that is different from the personalized error message for User 1, and which includes multiple hyperlinks to different text-based narrative explanations of the error condition.

Process for Personalizing Error Messages Based on User Behavior

Figure 3:
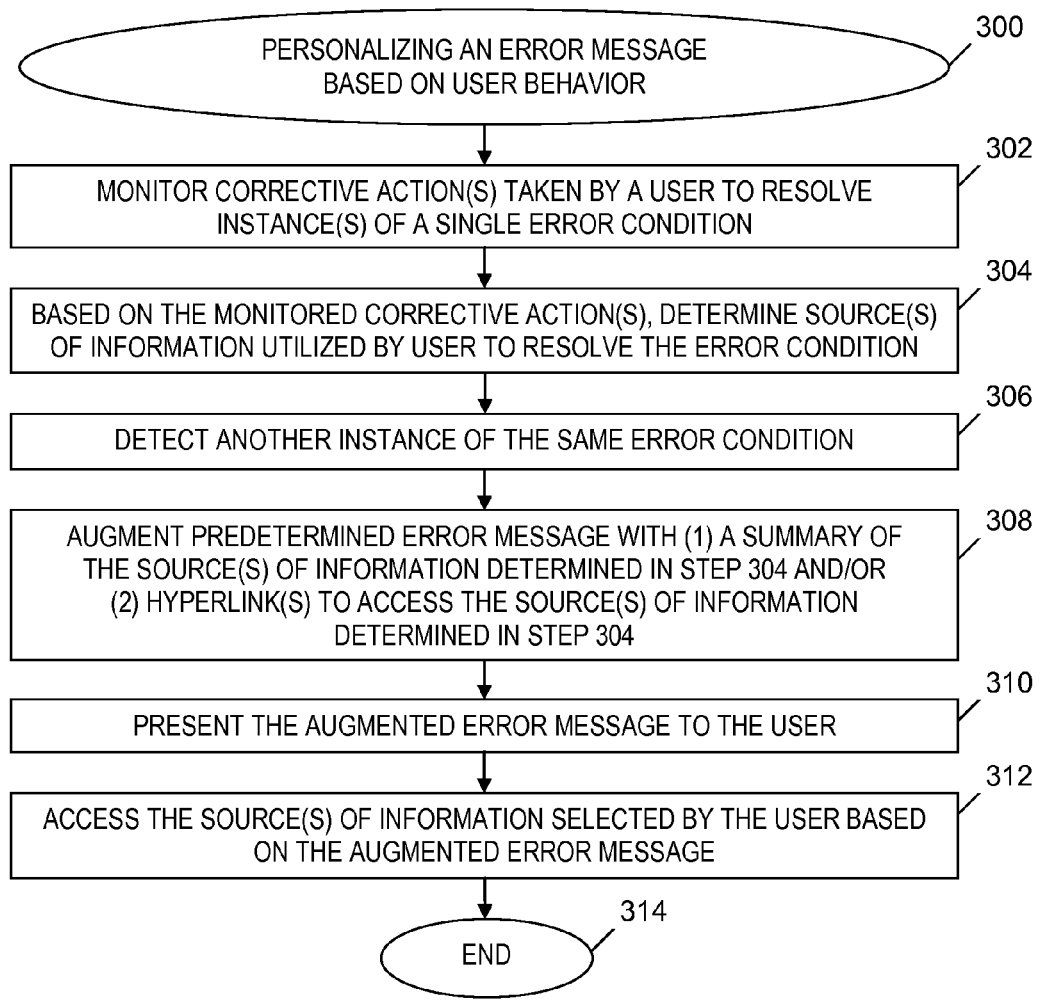
FIG. 3 is a flowchart of a process of personalizing an error message for a user based on previous behavior of the user, where the process is implemented in the system of FIG. 1, in accordance with embodiments of the present invention.

FIG. 3 is a flowchart of a process of personalizing an error message for a user based on previous behavior of the user, where the process is implemented in the system of FIG. 1, in accordance with embodiments of the present invention. The process of personalizing an error message based on user behavior starts at step 300. In step 302, error message personalization program 104 (see FIG. 1) monitors behavior of a user, including one or more corrective actions taken by the user to resolve corresponding instance(s) of single error condition that specifies an error in the operation of software application 106 (see FIG. 1) or computer 102 (see FIG. 1). Error message personalization program 104 (see FIG. 1) stores the monitored behavior in a data repository, which includes user behaviors 118 (see FIG. 1). In one embodiment, the monitored behavior of the user includes website(s) accessed by the user, online forum(s) visited by the user, and help manuals and other documentation downloaded or viewed by the user.

In step 304, based on the corrective action(s) monitored in step 302, error message personalization program 104 (see FIG. 1) determines source(s) of information utilized by the user to resolve the error specified by the error condition. The source(s) of information were utilized by the user as a result of the corrective action(s) taken by the user to resolve the error condition.

In step 306, after monitoring the behavior of the user including the previous corrective action(s) taken by the user to resolve the error specified by the error condition, error detection tool 110 (see FIG. 1) detects another instance of the same error condition and retrieves a predetermined error message 112 (see FIG. 1) from a data repository. Error message personalization program 104 (see FIG. 1) receives from error detection tool 110 (see FIG. 1) an indication that the same error condition has been detected again and receives the retrieved error message 112 (see FIG. 1).

In step 308, error message personalization program 104 (see FIG. 1) augments the retrieved error message 112 (see FIG. 1) with (1) a summary of the source(s) of information determined in step 304 and/or hyperlinks to access the aforementioned source(s) of information. The augmented error message resulting from step 308 is also referred to as the personalized error message 120 (see FIG. 1).

In step 310, error message personalization program 104 (see FIG. 1) presents the personalized error message 120 (see FIG. 1) to the user (e.g., initiates a display of the personalized error message 120 (see FIG. 1) on a screen being viewed by the user).

After step 310 and prior to step 312, error message personalization program 104 (see FIG. 1) receives a selection by the user to access the at least one of the aforementioned source(s) of information based on the user viewing the personalized error message 120 (see FIG. 1). In step 312, error message personalization program 104 (see FIG. 1) accesses the selected source(s) of information.

In step 314, the process of personalizing an error message based on user behavior ends.

As one example, in step 302, error message personalization program 104 (see FIG. 1) monitors a corrective action taken by the user to resolve an error condition. The monitored corrective action includes the user accessing website XYZ and downloading a document ABC to resolve an error specified by the error condition. In this example, step 304 includes determining website XYZ and document ABC as sources of information. Furthermore, in this example, step 308 includes augmenting an error message with a statement that includes a hyperlink: "Click here to see what worked for you the last time you resolved this error condition," where activating the hyperlink displays a summary of the user's previous behavior of accessing website XYZ and downloading document ABC, and also displays other hyperlinks that when activated access website XYZ and download document ABC.

In one embodiment, the processes of FIGS. 2A-2B and FIG. 3 are combined so that the personalized error message 120 (see FIG. 1) results from both the augmentation of the predetermined error message 112 (see FIG. 1) with the communication and/or hyperlink in step 212 (see FIG. 2B) and the augmentation with the summary of and/or the hyperlink(s) to access the source(s) of information in step 308 (see FIG. 3).

In one embodiment, prior to step 310, error message personalization program 104 (see FIG. 1) retrieves information from a user profile for the user and further augments the predetermined error message in step 310 with retrieved information (e.g., the user's name) and/or based on the retrieved information (e.g., the user's age). The user profile is stored in a data repository such as a database.

In one embodiment, the process of FIG. 3 is performed multiple times for different users, which results in different personalized error messages being generated in step 308 for respective users. For example, in a first performance of the process of FIG. 3, the monitoring in step 302 of the corrective actions taken by User 1 to resolve an error condition reveals that User 1 accessed website XYZ and downloaded document ABC from website XYZ. Furthermore, in a second performance of the process of FIG. 3, the monitoring in step 302 of the corrective actions taken by User 2 to resolve the same error condition as the one resolved by User 1 reveals that User 2 has corrected the error condition by visiting an online forum WXY. In this example, step 308 in the first performance of the process of FIG. 3 generates a personalized error message for User 1 that includes a summary of User 1 visiting website XYZ to download document ABC to resolve the error condition. Moreover, step 308 in the second performance of the process of FIG. 3 in this example generates a personalized error message for User 2 that is different from the personalized error message for User 1, and which includes a summary of User 2 visiting the online forum WXY to resolve the error condition.

EXAMPLES

FIG. 4 is an exemplary model 400 used to determine a user's learning style in step 209 (see FIG. 2A), in accordance with embodiments of the present invention. Error message personalization program 104 (see FIG. 1) generates model 400 as a Bayesian network that includes a learning style 402 of a user, where the learning style is deduced from four critical dichotomous and continuous dimensions: perception 404, input 406, understanding 408 and processing 410. The perception 404 dimension indicates the type of information (i.e., sensory or intuitive) that the user preferentially perceives. Sensory information includes sights, sounds, and physical sensations. Intuitive information includes ideas, insights, and memories. The input 406 dimension indicates the mode (i.e., visual or verbal) through which the user most effectively receives information. The understanding 408 dimension indicates how the user progresses towards understanding—sequentially or globally. The processing 410 dimension indicates how the user prefers to process information—actively or reflectively.

Error message personalization program 104 (see FIG. 1) deduces each of the four critical dimensions from one or more of the following attributes of help content 108 (see FIG. 1) that the user utilizes to resolve error conditions associated with software application 106 (see FIG. 1) or computer 102 (see FIG. 1): learning type 412, learning format 414, interactivity level 416, interactivity type 418 and semantic density 420. The arrows from the four critical dimensions to the attributes in the bottom row of model 400 indicate the attributes that are the basis for deducing the critical dimension. For instance, the two arrows from perception 404 to learning type 412 and learning format 414 indicate that the perception 404 dimension is deduced from learning type 412 and learning format 414. The attributes 412, 414, 416, 418 and 420 are described in more detail above in the discussion of FIGS. 2A-2B.

Figure 5A:
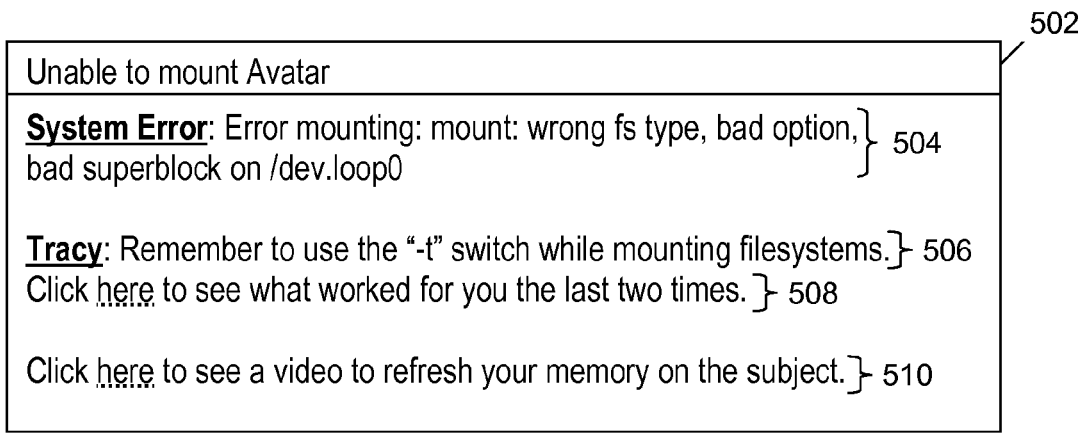
FIGS. 5A, 5B and 5C are exemplary personalized error messages generated by the system of FIG. 1, in accordance with embodiments of the present invention.
Figure 5B:
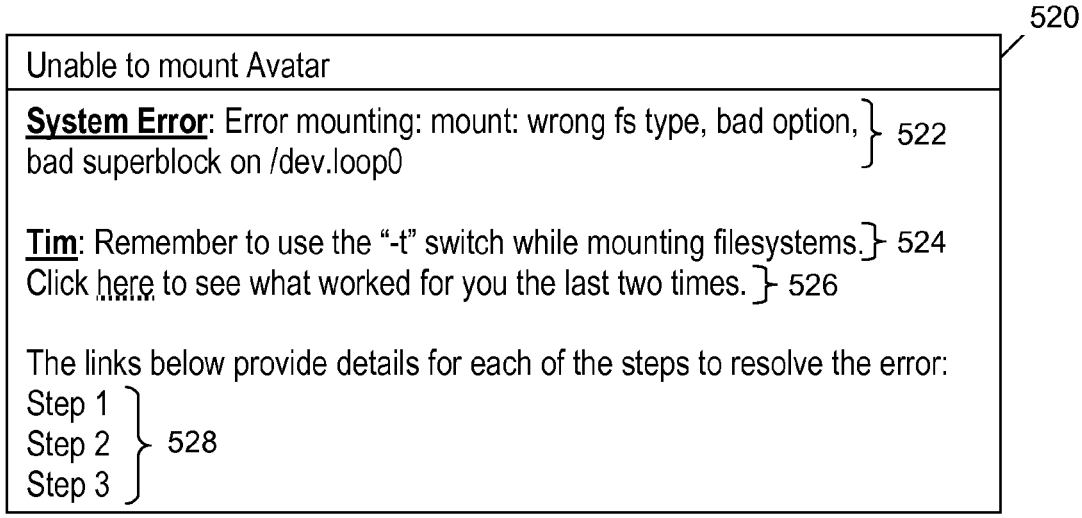
Figure 5C:
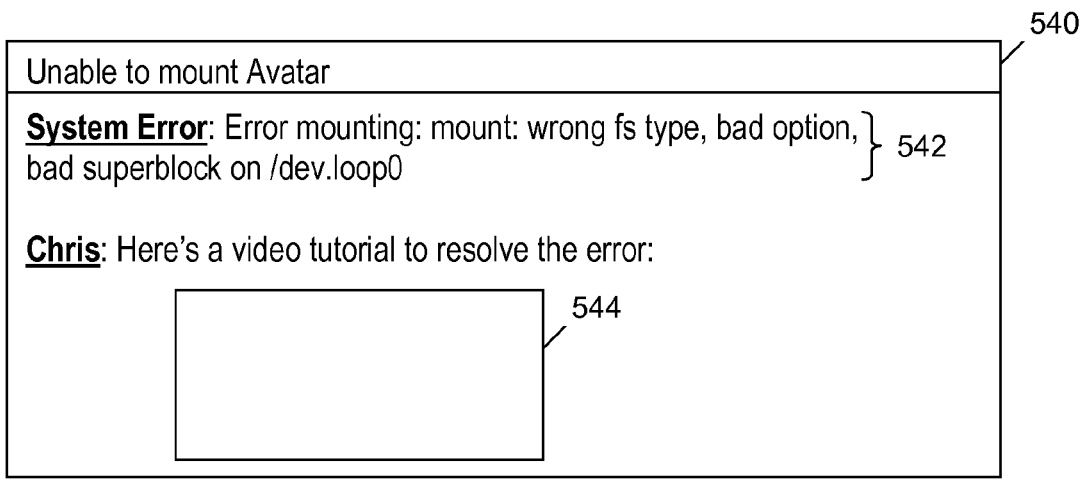

FIGS. 5A, 5B and 5C are exemplary personalized error messages generated by the system of FIG. 1, in accordance with embodiments of the present invention. Personalized error message 502 in FIG. 5A is an example of an augmented error message resulting from step 212 (see FIG. 2B) and step 308 (see FIG. 3). Personalized error message 502 includes a predetermined error message 504 describing the error "Unable to mount Avatar," which is augmented by messages 506, 508 and 510. Message 506 is a textual instruction that is compatible with a learning style that includes an input dimension that indicates a strong preference for verbal input in the form of written words. Message 510 includes a hyperlink that when selected displays a video that includes spoken instructions about the error condition. The video which includes spoken instructions accessed via message 510 is compatible with a learning style that includes an input dimension that indicates a strong preference for verbal input in the form of spoken words. Messages 506 and 510 augment error message 504 in step 212 (see FIG. 2B). Message 508 includes a hyperlink that when selected displays a summary of the corrective action(s) taken by the user the last two times the user encountered the same error message of "Unable to mount Avatar." Message 508 augments error message 504 in step 308 (see FIG. 3).

Personalized error message 520 in FIG. 5B is an example of an augmented error message resulting from step 212 (see FIG. 2B) and step 308 (see FIG. 3). Personalized error message 520 includes a predetermined error message 522 describing the error "Unable to mount Avatar," which is augmented by messages 524, 526 and 528. Message 524 is a textual instruction that is compatible with a learning style that includes an input dimension that indicates a strong preference for verbal input in the form of written words. Message 528 includes hyperlinks that when selected display details of steps to resolve the error condition "Unable to mount Avatar." The hyperlinks to access the details of the steps is content compatible with a learning style that includes an understanding dimension that indicates a strong preference for learning sequentially with a focus on details. Messages 524 and 528 augment error message 522 in step 212 (see FIG. 2B). Message 526 includes a hyperlink that when selected displays a summary of the corrective action(s) taken by the user the last two times the user encountered the same error message of "Unable to mount Avatar." Message 526 augments error message 522 in step 308 (see FIG. 3).

Personalized error message 540 in FIG. 5C is an example of an augmented error message resulting from step 212 (see FIG. 2B). Personalized error message 540 includes a predetermined error message 542 describing the error "Unable to mount Avatar," which is augmented by a window 544 that shows a video tutorial to resolve the error condition. Window 544 provides a video with flowcharts and spoken words, which is compatible with a learning style that includes an input dimension that indicates a mixed preference visual learning and verbal learning. The window that shows the video tutorial also provides details in a step-by-step manner, which is content compatible with a learning style that includes an understanding dimension that indicates a strong preference for learning sequentially with a focus on details. The window 544 augments error message 542 in step 212 (see FIG. 2B).

Computer System

Figure 6:
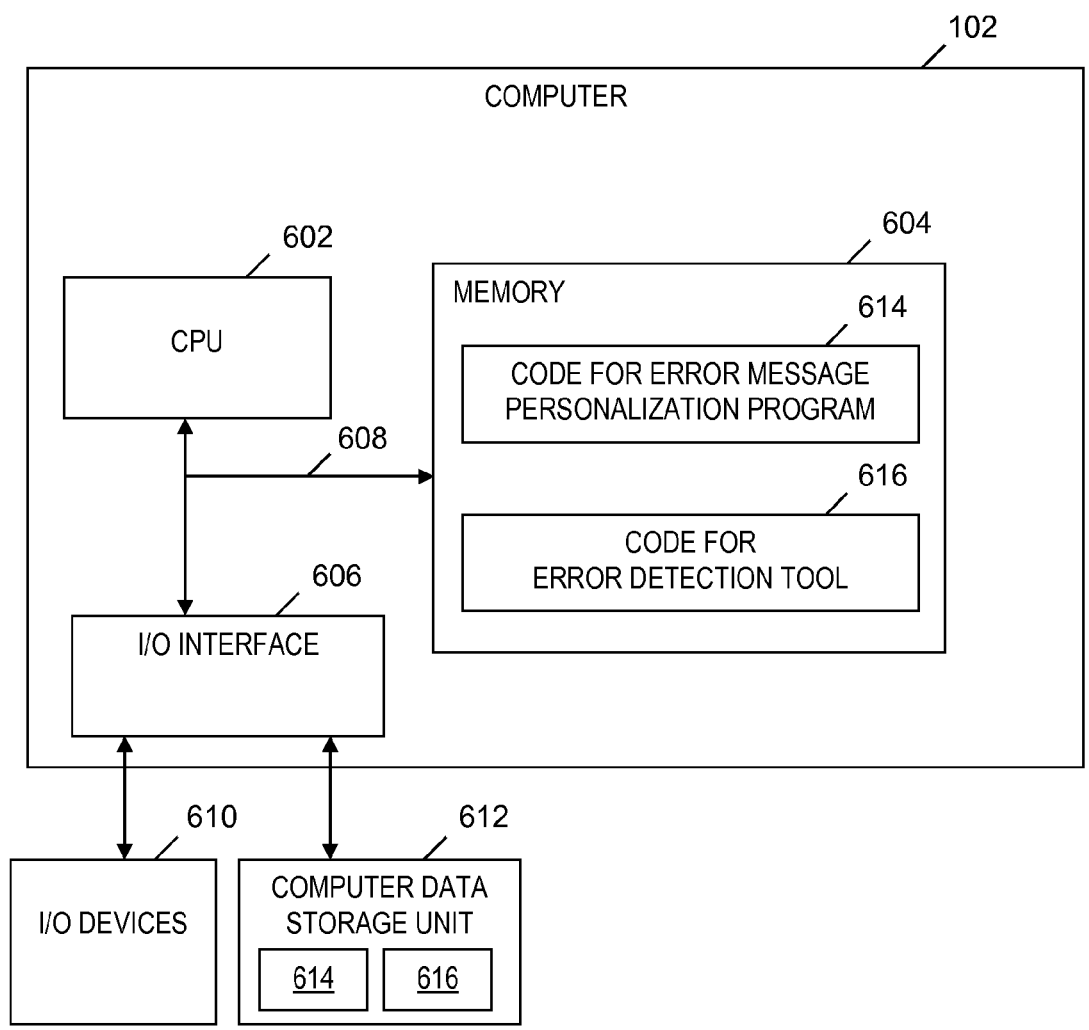
FIG. 6 is a block diagram of a computer that is included in the system of FIG. 1 and that implements at least one of the processes of FIGS. 2A-2B and FIG. 3, in accordance with embodiments of the present invention.

FIG. 6 is a block diagram of a computer that is included in the system of FIG. 1 and that implements at least one of the processes of FIGS. 2A-2B and FIG. 3, in accordance with embodiments of the present invention. Computer 102 generally includes a central processing unit (CPU) 602, a memory 604, an input/output (I/O) interface 606, and a bus 608. Further, computer 102 is coupled to I/O devices 610 and a computer data storage unit 612. CPU 602 performs computation and control functions of computer 102, including executing instructions included in program code 614 for error message personalization program 104 (see FIG. 1) and program code 616 for error detection tool 110 (see FIG. 1) to perform a method of personalizing error messages, where the instructions are executed by CPU 602 via memory 604. CPU 602 may include a single processing unit, or be distributed across one or more processing units in one or more locations (e.g., on a client and server).

Memory 604 includes a known computer-readable storage medium, which is described below. In one embodiment, cache memory elements of memory 604 provide temporary storage of at least some program code (e.g., program code 614) in order to reduce the number of times code must be retrieved from bulk storage while instructions of the program code are executed. Moreover, similar to CPU 602, memory 604 may reside at a single physical location, including one or more types of data storage, or be distributed across a plurality of physical systems in various forms. Further, memory 604 can include data distributed across, for example, a local area network (LAN) or a wide area network (WAN).

I/O interface 606 includes any system for exchanging information to or from an external source. I/O devices 610 include any known type of external device, including a display device (e.g., monitor), keyboard, mouse, printer, speakers, handheld device, facsimile, etc. Bus 608 provides a communication link between each of the components in computer 102, and may include any type of transmission link, including electrical, optical, wireless, etc.

I/O interface 606 also allows computer 102 to store information (e.g., data or program instructions such as program code 614) on and retrieve the information from computer data storage unit 612 or another computer data storage unit (not shown). In one embodiment, program code 614 is stored on computer data storage unit 612. Computer data storage unit 612 includes a known computer-readable storage medium, which is described below. In one embodiment, computer data storage unit 612 is a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614 that includes instructions that are executed by CPU 602 via memory 604 to personalize error messages. Although FIG. 6 depicts memory 604 as including program code 614, the present invention contemplates embodiments in which memory 604 does not include all of code 614 simultaneously, but instead at one time includes only a portion of code 614.

Further, memory 604 may include other systems not shown in FIG. 6, such as an operating system (e.g., Linux®) that runs on CPU 602 and provides control of various components within and/or connected to computer 102. Linux is a registered trademark of Linus Torvalds in the United States, other countries, or both.

Storage unit 612 and/or one or more other computer data storage units (not shown) that are coupled to computer 102 may store data from external data source(s) 122 (see FIG. 1) and/or data warehouse 126 (see FIG. 1).

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 604 and/or computer data storage unit 612) having computer-readable program code (e.g., program code 614) embodied or stored thereon.

Any combination of one or more computer-readable mediums (e.g., memory 604 and computer data storage unit 612) may be utilized. In one embodiment, the computer-readable medium is a computer-readable storage medium. In another embodiment, the computer-readable medium is a computer-readable signal medium. As used herein, a computer-readable storage medium is not a computer-readable signal medium.

In one embodiment, the computer-readable storage medium is a physical, tangible computer-readable storage device or physical, tangible computer-readable storage apparatus that stores but does not propagate, and is not a transitory form of signal transmission. A computer-readable storage medium may include, for example, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is a physical, tangible storage medium that can contain or store a program (e.g., program 614) for use by or in connection with a system, apparatus, or device for carrying out instructions in the program, and which does not propagate. The term "computer-readable storage device" does not include signal propagation media such as copper cables, optical fibers and wireless transmission media.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 614) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 614) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer 102 or another computer system (not shown) having components analogous to the components of computer 102 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B and FIG. 3) and/or block diagrams of methods, apparatus (systems) (e.g., FIG. 1 and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 614). These computer program instructions may be provided to one or more hardware processors (e.g., CPU 602) of a general purpose computer, special purpose computer, or other programmable data processing apparatus to produce a machine, such that the instructions, which are executed via the processor(s) of the computer or other programmable data processing apparatus, create means for implementing the functions/acts specified in the flowcharts and/or block diagram block or blocks.

These computer program instructions may also be stored in a computer-readable medium (e.g., memory 604 or computer data storage unit 612) that can direct a computer (e.g., computer 102), other programmable data processing apparatus, or other devices to function in a particular manner, such that the instructions (e.g., program 614) stored in the computer-readable medium produce an article of manufacture including instructions which implement the function/act specified in the flowcharts and/or block diagram block or blocks.

The computer program instructions may also be loaded onto a computer (e.g., computer 102), other programmable data processing apparatus, or other devices to cause a series of operational steps to be performed on the computer, other programmable apparatus, or other devices to produce a computer-implemented process such that the instructions (e.g., program 614) which are executed on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to personalizing error messages. Thus, an embodiment of the present invention discloses a process for supporting computer infrastructure, where the process includes providing at least one support service for at least one of integrating, hosting, maintaining and deploying computer-readable code (e.g., program code 614) in a computer system (e.g., computer 102) including one or more processors (e.g., CPU 602), wherein the processor(s) carry out instructions contained in the code causing the computer system to personalize error messages. Another embodiment discloses a process for providing at least one support service for at least one of creating, integrating, hosting, maintaining, and deploying computer-readable program code 614 in computer 102, where program code 614 is executed by CPU 602 to implement the steps included in FIGS. 2A-2B and FIG. 3.

The flowcharts in FIGS. 2A-2B and FIG. 3 and the block diagrams in FIG. 1 and FIG. 6 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 614), which includes one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of personalizing an error message for a user, the method comprising the steps of:

a computer modifying a help system that is supplied with a software application, so that interactions with the help system by users of the software application are monitored, and so that the help system includes instructions about respective error conditions which indicate respective problems with an operation of the software application, each instruction being in first, second, third, and fourth formats, the first format being compatible with a first learning style of first users of the software application, the first learning style indicating a preference for verbal input in a form of spoken words, the second format being compatible with a second learning style of second users of the software application, the second learning style indicating a preference for verbal input in a form of written words, the third format being compatible with a third learning style of third users of the software application, the third learning style indicating a preference for visual input without verbal input, and the fourth format being compatible with a fourth learning style of fourth users of the software application, the fourth learning style indicating a preference for a mixture of visual and verbal input;

subsequent to the step of modifying, the computer detecting the error conditions which indicate the problems with the operation of the software application;

based on the help system being modified and the interactions by users of the software application being monitored, the computer tracking and recording selections by the user of (1) content of the help system with which the user is interacting to resolve the detected error conditions and (2) types of the interactions with the help system by the user, the interactions accessing the content of the help system;

the computer determining a learning format, a learning type, an interactivity level, an interactivity type, and a semantic density as attributes of the content of the help system with which the user is interacting to resolve the detected error conditions, the learning format being a format of the content that the user utilizes to learn about the detected error conditions and actions to resolve the error conditions, the format of the content being a format of text, image, audio, video or application, the learning type being a type of the content that the user utilizes to learn about the detected error conditions and the actions to resolve the error conditions, the type of the content being a learning exercise, a simulation, a questionnaire, a figure, an index, a table of information, a narrative text, an exam, or a lecture, the interactivity level being an indicator of an amount of interactivity provided by the content that the user utilizes to learn about the detected error conditions and the actions to resolve the error conditions, the interactivity type being a type of interactivity provided by the content that the user utilizes to learn about the detected error conditions and the actions to resolve the error conditions, the type of interactivity being active, expositive, or a mixture of active and expositive, and the semantic density being an indicator of a number of instances of the learning type that is preferred by the user to learn about the detected error conditions and the actions to resolve the error conditions;

based on the content of the help system with which the user is interacting to resolve the detected error conditions, the types of the interactions with the help system, and the attributes of the content of the help system which include the learning format, the learning type, the interactivity level, the interactivity type, and the semantic density, the computer generating a model of a learning style of the user, the model being a Bayesian network;

based on the model and the model being the Bayesian network, the computer determining the learning style of the user is the first, second, third, or fourth learning style;

subsequent to the step of determining the learning style is the first, second, third, or fourth learning style, the computer detecting an error condition included in the error conditions which indicate the respective errors in the operation of the software application;

based on the detected error condition, the computer retrieving a predetermined error message from the data repository that includes a plurality of predetermined error messages, the retrieved predetermined error message describing the detected error condition;

if the learning style of the user was determined to be the first learning style, the computer augmenting the predetermined error message with a first instruction included in the instructions in the first format, if the learning style of the user was determined to be the second learning style, the computer augmenting the predetermined error message with a second instruction included in the instructions in the second format, if the learning style of the user was determined to be the third learning style, the computer augmenting the predetermined error message with a third instruction included in the instructions in the third format, or if the learning style of the user was determined to be the fourth learning style, the computer augmenting the predetermined error message with a fourth instruction included in the instructions in the fourth format; and the computer presenting the augmented error message to the user during an interaction between the user and the software application.

2. The method of claim 1, further comprising the step of in response to the step of determining the learning style of the user, the computer selecting the first instruction from the instructions if the learning style of the user was determined to be the first learning style, the computer selecting the second instruction from the instructions if the learning style of the user was determined to be the second learning style, the computer selecting the third instruction from the instructions if the learning style of the user was determined to be the third learning style, or the computer selecting the fourth instruction from the instructions if the learning style of the user was determined to be the fourth learning style.

3. The method of claim 1, further comprising the steps of:
based on the help system being modified and the interactions of the users of the software application being monitored, the computer tracking and recording selections by a second user of (1) second content of the help system with which the second user is interacting to resolve the detected error conditions and (2) second types of the interactions with the help system by the second user;

the computer determining second attributes of the second content of the help system with which the second user is interacting to resolve the detected error conditions, the second attributes consisting of a second learning format, a second learning type, a second interactivity level, a second interactivity type, and a second semantic density;

based on a second model of a second learning style of the second user, which is based on the second content of the help system with which the second user is interacting to resolve the detected error conditions, the second types of the interactions with the help system, and the second attributes of the second content of the help system, the computer determining another learning style of the second user is the first, second, third, or fourth learning style;

subsequent to the step of determining the other learning style is the first, second, third, or fourth learning style, the computer detecting another error condition included in the error conditions which indicate the respective errors in the operation of the software application;

based on the detected other error condition, the computer retrieving a second error message from the data repository that includes the plurality of predetermined error messages, the retrieved second error message describing the detected other error condition;

if the other learning style of the second user was determined to be the first learning style, the computer augmenting the second error message with a fifth instruction included in the instructions in the first format, if the other learning style of the second user was determined to be the second learning style, the computer augmenting the second error message with a sixth instruction included in the instructions in the second format, if the other learning style of the second user was determined to be the third learning style, the computer augmenting the second error message with a seventh instruction included in the instructions in the third format, or if the other learning style of the second user was determined to be the fourth learning style, the computer augmenting the second error message with an eighth instruction included in the instructions in the fourth format; and the computer presenting the augmented second error message to the second user during an interaction between the second user and the software application, wherein the augmented second error message presented to the second user is different from the augmented error message presented to the user, and the augmented second error message being different from the augmented error message resulting from the other learning style of the second user being different from the learning style of the user.

4. The method of claim 1, wherein the step of tracking and recording the selections of the user includes tracking and recording the selections of the user from within the computer or via a monitoring agent external to the computer.

5. The method of claim 1, further comprising the steps of:
the computer retrieving information about the user from a user profile of the user, the information including a name of the user and/or characteristics of the user other than the attributes on which the learning style is based; and
the computer augmenting the error message with the retrieved information and/or with a message based on the retrieved information.

6. The method of claim 1, further comprising the step of the computer receiving an instruction from the user to look up the non-augmented error message in the help system, wherein the step of presenting the augmented error message is performed in response to the step of receiving the instruction to look up the non-augmented error message in the help system.

7. The method of claim 1, further comprising the step of providing at least one support service for at least one of creating, integrating, hosting, maintaining, and deploying computer-readable program code in the computer, the program code being executed by a processor of the computer to implement the steps of modifying the help system that is supplied with the software application, detecting the error conditions, tracking and recording the selections by the user, determining the learning format, learning type, interactivity level, interactivity type, and semantic density as the attributes, generating the model, determining the learning style is the first, second, third, or fourth learning style, detecting the error condition, retrieving the predetermined error message, augmenting the predetermined error message, and presenting the augmented error message.

8. A computer system comprising:
a central processing unit (CPU);
a memory coupled to the CPU;
a computer-readable, tangible storage device coupled to the CPU, the storage device containing instructions that are executed by the CPU via the memory to implement a method of personalizing an error message for a user, the method comprising:
the computer system modifying a help system that is supplied with a software application, so that interactions with the help system by users of the software application are monitored, and so that the help system includes instructions about respective error conditions which indicate respective problems with an operation of the software application, each instruction being in first, second, third, and fourth formats, the first format being compatible with a first learning style of first users of the software application, the first learning style indicating a preference for verbal input in a form of spoken words, the second format being compatible with a second learning style of second users of the software application, the second learning style indicating a preference for verbal input in a form of written words, the third format being compatible with a third learning style of third users of the software application, the third learning style indicating a preference for visual input without verbal input, and the fourth format being compatible with a fourth learning style of fourth users of the software application, the fourth learning style indicating a preference for a mixture of visual and verbal input;
subsequent to the step of modifying, the computer system detecting the error conditions which indicate the problems with the operation of the software application;
based on the help system being modified and the interactions by users of the software application being monitored, the computer system tracking and recording selections by the user of (1) content of the help system with which the user is interacting to resolve the detected error conditions and (2) types of the interactions with the help system by the user, the interactions accessing the content of the help system;
the computer system determining a learning format, a learning type, an interactivity level, an interactivity type, and a semantic density as attributes of the content of the help system with which the user is interacting to resolve the detected error conditions, the learning format being a format of the content that the user utilizes to learn about the detected error conditions and actions to resolve the error conditions, the format of the content being a format of text, image, audio, video or application, the learning type being a type of the content that the user utilizes to learn about the detected error conditions and the actions to resolve the error conditions, the type of the content being a learning exercise, a simulation, a questionnaire, a figure, an index, a table of information, a narrative text, an exam, or a lecture, the interactivity level being an indicator of an amount of interactivity provided by the content that the user utilizes to learn about the detected error conditions and the actions to resolve the error conditions, the interactivity type being a type of interactivity provided by the content that the user utilizes to learn about the detected error conditions and the actions to resolve the error conditions, the type of interactivity being active, expositive, or a mixture of active and expositive, and the semantic density being an indicator of a number of instances of the learning type that is preferred by the user to learn about the detected error conditions and the actions to resolve the error conditions;
based on the content of the help system with which the user is interacting to resolve the detected error conditions, the types of the interactions with the help system, and the attributes of the content of the help system which include the learning format, the learning type, the interactivity level, the interactivity type, and the semantic density, the computer system generating a model of a learning style of the user, the model being a Bayesian network;
based on the model and the model being the Bayesian network, the computer system determining the learning style of the user is the first, second, third, or fourth learning style;
subsequent to the step of determining the learning style is the first, second, third, or fourth learning style, the computer system detecting an error condition included in the error conditions which indicate the respective errors in the operation of the software application;
based on the detected error condition, the computer system retrieving a predetermined error message from the data repository that includes a plurality of predetermined error messages, the retrieved predetermined error message describing the detected error condition;
if the learning style of the user was determined to be the first learning style, the computer system augmenting the predetermined error message with a first instruction included in the instructions in the first format, if the learning style of the user was determined to be the second learning style, the computer system augmenting the predetermined error message with a second instruction included in the instructions in the second format, if the learning style of the user was determined to be the third learning style, the computer system augmenting the predetermined error message with a third instruction included in the instructions in the third format, or if the learning style of the user was determined to be the fourth learning style, the computer system augmenting the predetermined error message with a fourth instruction included in the instructions in the fourth format; and
the computer system presenting the augmented error message to the user during an interaction between the user and the software application.

9. The computer system of claim 8, wherein the method further comprises the step of in response to the step of determining the learning style of the user, the computer system selecting the first instruction from the instructions if the learning style of the user was determined to be the first learning style, the computer selecting the second instruction from the instructions if the learning style of the user was determined to be the second learning style, the computer selecting the third instruction from the instructions if the learning style of the user was determined to be the third learning style, or the computer selecting the fourth instruction from the instructions if the learning style of the user was determined to be the fourth learning style.

10. The computer system of claim 8, wherein the method further comprises the steps of:

based on the help system being modified and the interactions of the users of the software application being monitored, the computer system tracking and recording selections by second user of (1) second content of the help system with which the second user is interacting to resolve the detected error conditions and (2) second types of the interactions with the help system by the second user, the computer system determining second attributes of the second content of the help system with which the second user is interacting to resolve the detected error conditions, the second attributes consisting of a second learning format, a second learning type, a second interactivity level, a second interactivity type, and a second semantic density;

based on a second model of a second learning style of the second user, which is based on the second content of the help system with which the second user is interacting to resolve the detected error conditions, the second types of the interactions with the help system, and the second attributes of the second content of the help system, the computer system determining another learning style of the second user is the first, second, third, or fourth learning style;

subsequent to the step of determining the other learning style is the first, second, third, or fourth learning style, the computer system detecting another error condition included in the error conditions which indicate the respective errors in the operation of the software application;

based on the detected other error condition, the computer system retrieving a second error message from the data repository that includes the plurality of predetermined error messages, the retrieved second error message describing the detected other error condition;

if the other learning style of the second user was determined to be the first learning style, the computer system augmenting the second error message with a fifth instruction included in the instructions in the first format, if the other learning style of the second user was determined to be the second learning style, the computer system augmenting the second error message with a sixth instruction included in the instructions in the second format, if the other learning style of the second user was determined to be the third learning style, the computer system augmenting the second error message with a seventh instruction included in the instructions in the third format, or if the other learning style of the second user was determined to be the fourth learning style, the computer system augmenting the second error message with an eighth instruction included in the instructions in the fourth format and the computer system presenting the augmented second error message to the second user during an interaction between the second user and the software application, wherein the augmented second error message presented to the second user is different from the augmented error message presented to the user, and the augmented second error message being different from the augmented error message resulting from the other learning style of the second user being different from the learning style of the user.

11. The computer system of claim 8, wherein the step of tracking and recording the selections of the user includes tracking and recording the selections of the user from within the computer system or via a monitoring agent external to the computer system.

12. The computer system of claim 8, wherein the method further comprises the steps of:

the computer system retrieving information about the user from a user profile of the user, the information including a name of the user and/or characteristics of the user other than the attributes on which the learning style is based; and the computer system augmenting the error message with the retrieved information and/or with a message based on the retrieved information.

13. A computer program product, comprising:

a computer-readable, tangible storage device which is not a signal or a signal propagation medium; and a computer-readable program code stored in the computer-readable, tangible storage device, the computer-readable program code containing instructions that are executed by a central processing unit (CPU) of a computer system to implement a method of personalizing an error message for a user, the method comprising:

the computer system modifying a help system that is supplied with a software application, so that interactions with the help system by users of the software application are monitored, and so that the help system includes instructions about respective error conditions which indicate respective problems with an operation of the software application, each instruction being in first, second, third, and fourth formats, the first format being compatible with a first learning style of first users of the software application, the first learning style indicating a preference for verbal input in a form of spoken words, the second format being compatible with a second learning style of second users of the software application, the second learning style indicating a preference for verbal input in a form of written words, the third format being compatible with a third learning style of third users of the software application, the third learning style indicating a preference for visual input without verbal input, and the fourth format being compatible with a fourth learning style of fourth users of the software application, the fourth learning style indicating a preference for a mixture of visual and verbal input subsequent to the step of modifying, the computer system detecting the error conditions which indicate the problems with the operation of the software application;

based on the help system being modified and the interactions by users of the software application being monitored, the computer system tracking and recording selections by the user of (1) content of the help system with which the user is interacting to resolve the detected error conditions and (2) types of the interactions with the help system by the user, the interactions accessing the content of the help system;

the computer system determining a learning format, a learning type, an interactivity level, an interactivity type, and a semantic density as attributes of the content of the help system with which the user is interacting to resolve the detected error conditions, the learning format being a format of the content that the user utilizes to learn about the detected error conditions and actions to resolve the error conditions, the format of the content being a format of text, image, audio, video or application, the learning type being a type of the content that the user utilizes to learn about the detected error conditions and the actions to resolve the error conditions, the type of the content being a learning exercise, a simulation, a questionnaire, a figure, an index, a table of information, a narrative text, an exam, or a lecture, the interactivity level being an indicator of an amount of interactivity provided by the content that the user utilizes to learn about the detected error conditions and the actions to resolve the error conditions, the interactivity type being a type of interactivity provided by the content that the user utilizes to learn about the detected error conditions and the actions to resolve the error conditions, the type of interactivity being active, expositive, or a mixture of active and expositive, and the semantic density being an indicator of a number of instances of the learning type that is preferred by the user to learn about the detected error conditions and the actions to resolve the error conditions;

based on the content of the help system with which the user is interacting to resolve the detected error conditions, the types of the interactions with the help system, and the attributes of the content of the help system which include the learning format, the learning type, the interactivity level, the interactivity type, and the semantic density, the computer system generating a model of a learning style of the user, the model being a Bayesian network;

based on the model and the model being the Bayesian network, the computer system determining the learning style of the user is the first, second, third, or fourth learning style;

subsequent to the step of determining the learning style is the first, second, third, or fourth learning style, the computer system detecting an error condition included in the error conditions which indicate the respective errors in the operation of the software application;

based on the detected error condition, the computer system retrieving a predetermined error message from the data repository that includes a plurality of predetermined error messages, the retrieved predetermined error message describing the detected error condition;

if the learning style of the user was determined to be the first learning style, the computer system augmenting the predetermined error message with a first instruction included in the instructions in the first format, if the learning style of the user was determined to be the second learning style, the computer system augmenting the predetermined error message with a second instruction included in the instructions in the second format, if the learning style of the user was determined to be the third learning style, the computer system augmenting the predetermined error message with a third instruction included in the instructions in the third format, or if the learning style of the user was determined to be the fourth learning style, the computer system augmenting the predetermined error message with a fourth instruction included in the instructions in the fourth format; and the computer system presenting the augmented error message to the user during an interaction between the user and the software application.

14. The program product of claim 13, wherein the method further comprises the step of in response to the step of determining the learning style of the user, the computer system selecting the first instruction from the instructions if the learning style of the user was determined to be the first learning style, the computer selecting the second instruction from the instructions if the learning style of the user was determined to be the second learning style, the computer selecting the third instruction from the instructions if the learning style of the user was determined to be the third learning style, or the computer selecting the fourth instruction from the instructions if the learning style of the user was determined to be the fourth learning style.

15. The program product of claim 13, wherein the method further comprises the steps of:

based on the help system being modified and the interactions of the users of the software application being monitored, the computer system tracking and recording selections by a second user of (1) second content of the help system with which the second user is interacting to resolve the detected error conditions and (2) second types of the interactions with the help system by the second user;

the computer system determining second attributes of the second content of the help system with which the second user is interacting to resolve the detected error conditions, the second attributes consisting of a second learning format, a second learning type, a second interactivity level, a second interactivity type, and a second semantic density;

based on a second model of a second learning style of the second user, which is based on the second content of the help system with which the second user is interacting to resolve the detected error conditions, the second types of the interactions with the help system, and the second attributes of the second content of the help system, the computer system determining another learning style of the second user is the first, second, third, or fourth learning style;

subsequent to the step of determining the other learning style is the first, second, third, or fourth learning style, the computer system detecting another error condition included in the error conditions which indicate the respective errors in the operation of the software application;

based on the detected other error condition, the computer system retrieving a second error message from the data repository that includes the plurality of predetermined error messages, the retrieved second error message describing the detected other error condition;

if the other learning style of the second user was determined to be the first learning style, the computer system augmenting the second error message with a fifth instruction included in the instructions in the first format, if the other learning style of the second user was determined to be the second learning style, the computer system augmenting the second error message with a sixth instruction included in the instructions in the second format, if the other learning style of the second user was determined to be the third learning style, the computer system augmenting the second error message with a seventh instruction included in the instructions in the third format, or if the other learning style of the second user was determined to be the fourth learning style, the computer system augmenting the second error message with an eighth instruction included in the instructions in the fourth format and the computer system presenting the augmented second error message to the second user during an interaction between the second user and the software application, wherein the augmented second error message presented to the second user is different from the augmented error message presented to the user, and the augmented second error message being different from the augmented error message resulting from the other learning style of the second user being different from the learning style of the user.

16. The program product of claim 13, wherein the step of tracking and recording the selections of the user includes tracking and recording the selections of the user from within the computer system or via a monitoring agent external to the computer system.

17. The program product of claim 13, wherein the method further comprises the steps of:

the computer system retrieving information about the user from a user profile of the user, the information including a name of the user and/or characteristics of the user other than the attributes on which the learning style is based; and the computer system augmenting the error message with the retrieved information and/or with a message based on the retrieved information.

* * * * *